UNITED STATES PATENT OFFICE.

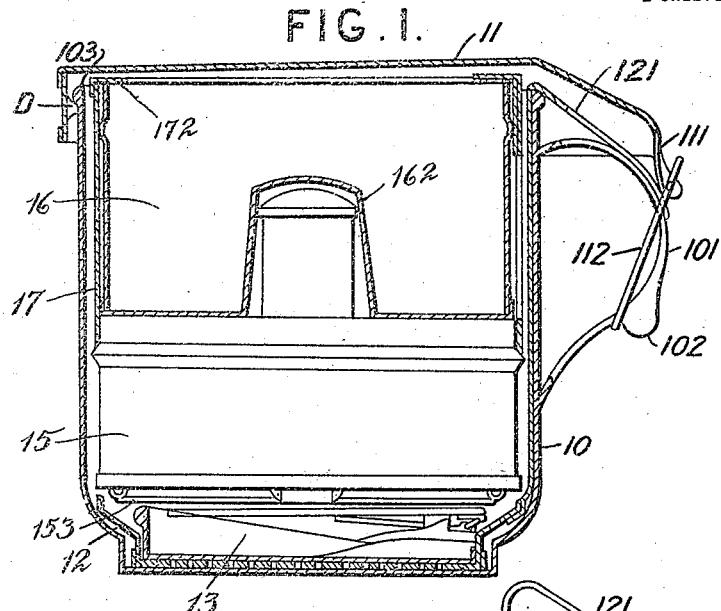
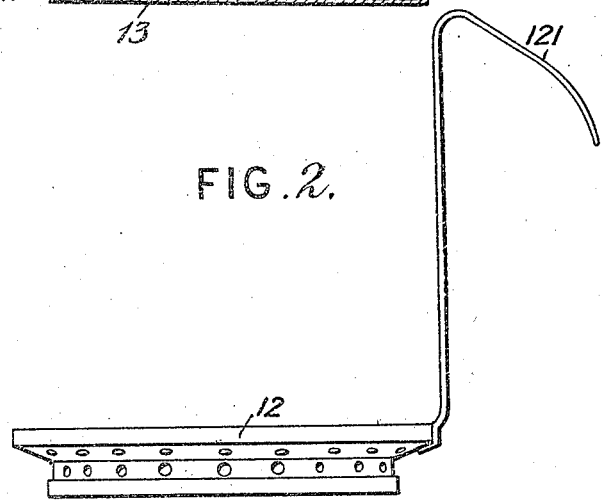
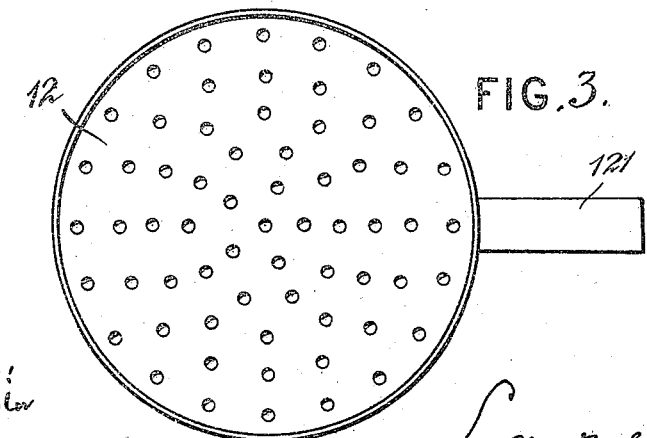

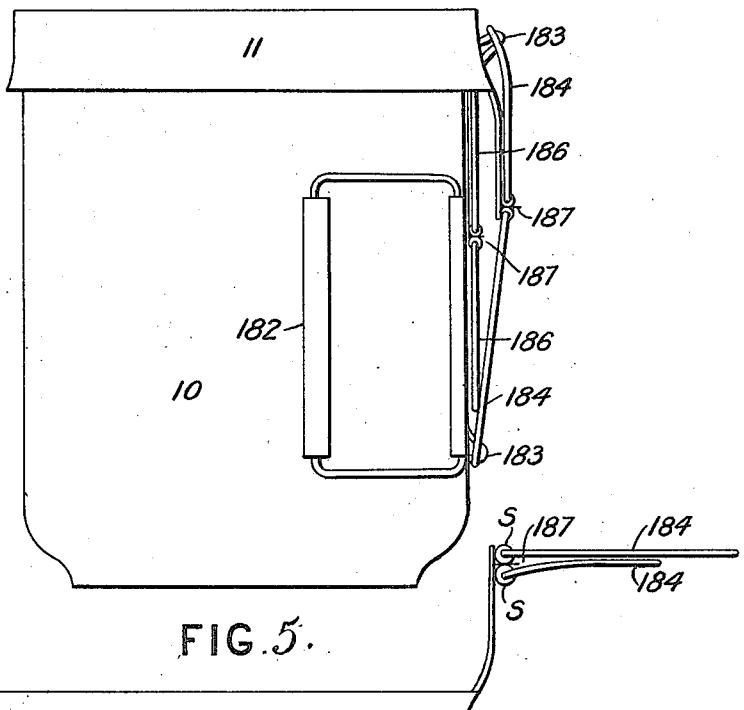
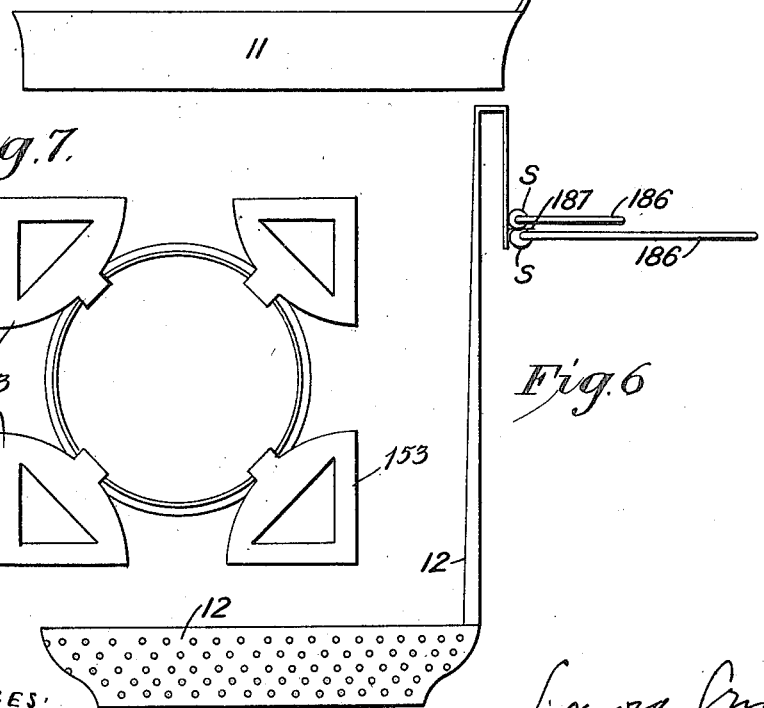
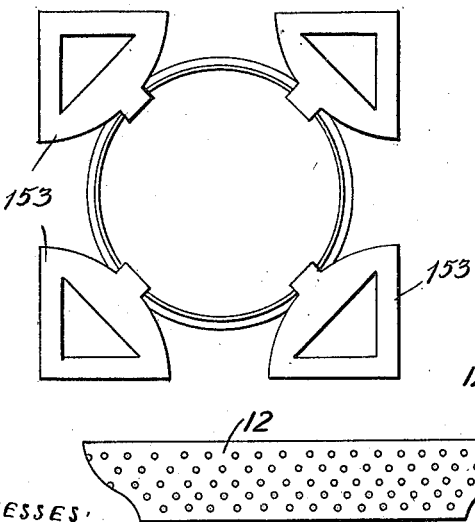

LAURA GRIMANI, OF HOVE, ENGLAND.

PORTABLE COOKING APPARATUS.

1,236,162.  Specification of Letters Patent.  Patented Aug. 7, 1917.

Application filed October 9, 1916. Serial No. 124,627.

*To all whom it may concern:*

Be it known that I, LAURA GRIMANI, a subject of the King of Italy, residing at The Turret, Hove Park, Hove, Sussex, England, have invented certain new and useful Improvements in a Portable Cooking Apparatus, of which the following is a specification.

My invention relates to improvements in portable and compact apparatus for making tea, coffee, cocoa, or similar beverage, for making soup, or for warming food.

The object is to simplify, lighten, and render more compact and safe apparatus of this kind, and to increase the quantity of tea, coffee, cocoa, or soup that may be prepared, so that an apparatus is provided that can be taken easily and conveniently on a picnic or journey for instance, and whereby a cup or cups of beverage or soup can be very quickly and easily prepared and the apparatus be readily packed again to be again used if necessary.

The invention includes a cup, preferably of enamelware, a spirit lamp, a draft screen for the lamp serving also as a support for the cup, a box for soup tablets, tea, cocoa, coffee or other beverage, and a cover which serves as a saucer, the lamp, screen, and box snugly compacting together and fitting snugly within the cup; there may also be a strainer, and a box having a central compartment to hold a folding spoon and side compartments for saccharin and matches respectively or other handy materials, the strainer and box also fitting snugly with the other articles within the cup. Other features included in the invention are the provision of hinged flaps on the base of the lamp to increase its stability, the provision of locking means with the folding handles of the cup, strainer, and saucer whereby the handles are held rigid in use, means for keeping the folding spoon rigid in use, the provision of lugs on the draft screen so arranged as to support the cup above the lighted lamp and to clip the tea, coffee, cocoa, or tablet box when the apparatus is packed, and the general arrangement by which the parts snugly and securely pack.

The accompanying drawing illustrates an apparatus made in accordance with my invention; the cup, strainer, and cover being each shown with two forms of handles.

In these drawings:—

Figure 1 is a sectional elevation of the complete apparatus showing the component parts or articles packed, the handles of the cup, strainer, and cover, being of the first form.

Fig. 2 is an elevation and Fig. 3 a plan of the corresponding strainer.

Fig. 4 is an elevation of the apparatus packed, the cup, cover, and strainer having modified handles.

Fig. 5 is an elevation of the corresponding cover, detached and in use as a saucer.

Fig. 6 is an elevation of the corresponding strainer, and

Fig. 7 is an underside plan of the lamp, arranged as in use, and illustrating the means for steadying the same.

Referring to Figs. 1–3, 10 is the cup or container, 11 is the cover, 12 is the strainer, 13 the box for containing saccharin, matches, a spoon or the like, 15 is the lamp, 16 is the tea box and 17 the support and draft screen.

The box 13 may have three compartments, one at each side, for saccharin and matches respectively, and it may have an open compartment for the reception of a folding spoon, as indicated in Fig. 1.

The underside of the lamp 15 is preferably provided with four hinged flaps 153, see Fig. 7, adapted to be opened out, as shown, and to act as a base and give stability.

The support and draft screen 17 is formed with openings to admit air to the flame and with lugs 172 to support the cup above the lamp during heating and to clip the tea box 16 when packed. The tea box 16 is made with a recess 162 to fit over the cap of the lamp.

When the apparatus is packed as shown in Fig. 1 the strainer 12 is placed in the bottom of the cup, the box 13 is placed in the strainer, the lamp 15 on the box 13, the tea box 16 surrounded by the support and draft screen 17, is placed on the lamp and the cover 11 engaged on the cup.

In the first form of the apparatus the cup 10 has a rim 103 and a non-folding handle 101 with a projection 102. The cover 11 has an inward projection, D, to engage the rim 103 and a lug 111 with a loop 112 to engage the projection 102, and the strainer 12 has a handle 121 adapted to lie along the handle of the cup and within the loop 112.

In the form of the apparatus shown in Figs. 4–6, the cup, strainer and cover have folding handles adapted to pack as shown at Fig. 4. The pivoted handles 182 of the cup are opened out and lie on the surface of the cup 10. The pivoted handles 186 of the strainer 12 are opened out, one to engage under the cover 11 and the other to lie along the cup, and the pivoted handles 184 of the cover are opened out and engaged on lugs 183 on the cover and cup respectively. The lug 183 on the cup prevents slipping of the cup about its handles when the handles are brought together and grasped by the user. In a similar manner the handles of the strainer and of the cover are held firmly in use by central flanges 187 formed by suitably bending the metal forming the socket S for the pivot of the folding handles.

To make a cup of tea for instance, the apparatus is unpacked, the strainer 12 only being left in the cup. The lamp is placed on a table or suitable substitute with the flaps 153 opened out, and the cap 151 of the lamp is removed. The support and draft excluder 17 is fitted on the lamp. The pivoted handles 186 of the strainer are joined together as in Fig. 6 as also are joined together the pivoted handles on the cup and the handles 184 of the cover. The cup is then filled with water and the cover is placed thereon with its handles and the other handles side by side above the draft screen, the wick of the lamp is ignited and the cup placed in the stand. When the water boils, the tea is put in and the flame extinguished. When the tea is brewed, the cover is removed, placed upside down, as in Fig. 5, to serve as a saucer. The strainer is lifted out of the cup carrying with it all the tea leaves.

Any other food may be cooked or warmed in the cup, the use of the apparatus for making tea being given merely as an example.

What I claim and desire to secure by Letters Patent in the United States of America is:—

1. In a portable cooking apparatus the combination of a cup, a spirit lamp adapted to fit within the cup and having a central burner, a box adapted to fit within the cup and having a central cavity in the bottom fitting over the lamp burner, a draft screen adapted to fit within the cup and to surround the box and having lugs at the top, handles to the cup, and a cover adapted to fit over the top of the combined device, substantially as and for the purposes set forth.

2. In a portable cooking apparatus, the combination of a cup, a strainer adapted to fit within the said cup and furnished with a handle extending up the inner side of the cup and terminating in two folding handles, a spirit lamp adapted to fit within the cup and above the strainer and having a central burner, a box adapted to fit within the cup and having a central cavity in the bottom fitting over the lamp burner, a draft screen adapted to fit within the cup and to surround the box and having lugs at the top, handles to the cup, and a cover adapted to fit over the combined device, substantially as and for the purposes set forth.

3. In a portable cooking apparatus the combination of a cup a strainer adapted to fit within the said cup, and furnished with a handle extending up the inner side of the cup, and terminating in two folding handles outside thereof, the strainer having a dished portion into which fits a box for containing a spoon, matches and the like, a spirit lamp adapted to fit on the strainer and the box fitted therein, the said lamp having a central burner, a box adapted to fit within the cup and having a central cavity in the bottom fitting over the lamp burner, a draft screen adapted to fit within the cup and to surround the box and having lugs at the top, handles to the cup, and a cover adapted to fit over the combined device, substantially as and for the purposes set forth.

4. In a portable cooking apparatus, the combination of a cup, a strainer, adapted to fit within the said cup and furnished with a handle extending up the inner side of the cup and terminating in two folding handles outside the cup a spirit lamp adapted to fit within the cup, and above the strainer, and having a central burner and also flaps hinged to its base which flaps are adapted to be turned against the bottom of the lamp or to be turned out to form a support, a box adapted to fit within the cup, and having a central cavity in the bottom, fitting over the lamp burner, a draft screen adapted to fit within the cup and to surround the box and having lugs at the top, and a cover with folding handles adapted to fit over the top of the combined device, such handles engaging on projections on the lid and cup and holding them steady when packed, substantially as and for the purposes set forth.

5. In a portable cooking apparatus, the combination of a cup, a strainer adapted to fit within the said cup and furnished with a strip extending up the inner side of the cup and provided with folding handles, a spirit lamp adapted to fit within the cup and above the strainer and having a central burner, a box adapted to fit within the cup and having a central cavity in the bottom fitting over the lamp burner, a draft screen adapted to fit within the cup and to surround the box and provided with lugs which clip the box when packed and support the cup above the lamp when in use, handles to the cup, and a cover provided with hinged handles, the arrangement of all the handles being such that they can be turned against the neighboring devices and form interlocking means to hold the parts in position, all substantially as and for the purposes set forth.

In testimony whereof, I affix my signature, in the presence of two witnesses.

LAURA GRIMANI.

Witnesses:
  LUTHER NAYLOR,
  ARTHUR HOLMES.

Copies of this patent may be obtained for five cents each, by addressing the "Commissioner of Patents, Washington, D. C."